United States Patent [19]

Wong et al.

[11] Patent Number: 4,722,965

[45] Date of Patent: Feb. 2, 1988

[54] CHALK ADHESION POLYMER COMPOSITION AND METHOD OF PREPARATION

[75] Inventors: Kian C. Wong; Patrick J. McDonald; Stanley J. Gromelski, Jr., all of Dover, Del.

[73] Assignee: Reichhold Chemicals, Inc., White Plains, N.Y.

[21] Appl. No.: 832,832

[22] Filed: Feb. 24, 1986

[51] Int. Cl.$^4$ .................. C08L 35/00; C08F 120/58; C08F 226/02

[52] U.S. Cl. .................................. 524/812; 526/304; 526/302; 526/307.3

[58] Field of Search .................. 526/307.3, 304, 203, 526/302, 303.1; 524/458, 812; 525/523, 217, 218

[56] References Cited

U.S. PATENT DOCUMENTS

| | | | |
|---|---|---|---|
| 2,666,044 | 1/1954 | Collin | 526/307.3 |
| 3,288,740 | 11/1966 | Moeder et al. | 520/304 |
| 3,732,184 | 5/1973 | Lindemann et al. | 526/304 |
| 4,504,609 | 3/1985 | Kurwajima et al. | 524/458 |
| 4,529,765 | 7/1985 | Den Hartog | 524/244 |
| 4,542,181 | 9/1985 | Schuppiser et al. | 524/458 |

OTHER PUBLICATIONS

Mattei et al., "Chalk Adhesion Polymer . . . ", Resin Review, vol. 24, No. 4, pp. 14–22 (Apr. 1975).

*Primary Examiner*—Edward J. Smith
*Assistant Examiner*—Peter F. Kulkosky
*Attorney, Agent, or Firm*—Rodman & Rodman

[57] ABSTRACT

A chalk-adhesion polymer latex for exterior coatings especially suitable for blending with an acrylic formulation, such as vinyl acetate/ acrylic copolymers. The polymer is derived from a monomer precursor composition, including an acrylic moiety, such as an acrylate and a methacrylate, together with small amounts of a nitrogen-containing alkyl acrylate, an acrylamide and propylene glycol. The method of preparing the chalk adhesion polymer includes emulsification stages to accomplish the polymerization.

15 Claims, No Drawings

CHALK ADHESION POLYMER COMPOSITION AND METHOD OF PREPARATION

BACKGROUND OF THE INVENTION

1. Field of the Invention

The present invention relates to a chalk adhesion polymer latex, comprising acrylates and methacrylates, and its method of preparation from a monomer composition. The polymer latex can be blended with vinyl acetate/acrylic copolymer coatings to form a finished latex coating composition with improved chalk adhesion properties.

2. Description of the Prior Art

Chalking has been defined as the formation of a friable powder on the surface of a paint film, caused by the disintegration of the binding medium due to disruptive factors during weathering. Chalking resistance is the ability of a coating to resist the formation of a friable powder on the surface of its film caused by the disintegration of the binding medium due to degradative weather factors.

One of the principal problems encountered in the formulation of paints, especially exterior house paints, is the improvement of chalk adhesion properties. An exterior paint coating with good chalk adhesion properties has the ability to penetrate a chalky coating, such as weathered paint, and to adhere to the surface beneath the chalky coating.

One of the primary uses for alkyd resins as components of water-based coatings is the modification of exterior latex house paints. Oleoresinous modifiers have been favored for this purpose because many paint manufacturers and users seek the added adhesion properties that alkyds impart to exterior formulations. Acrylic emulsions normally afford good adhesion to chalky surfaces under moderate exposure conditions, but under severe conditions failures can occur. Alkyds have therefore been employed in exterior latex paints to provide an extra safety factor of added adhesion.

However, alkyds also have shortcomings. While fully cured alkyds can provide an acrylic paint with extra adhesion on certain problem substrates, they adversely affect the fast-dry characteristics of the acrylic. An alkyd generally requires several days, the number varying with ambient conditions, to dry to a full cure and to develop optimum adhesion and blister resistance. As a result, an alkyd-modified paint has a greater chance of failure should inclement weather occur during the first few days following application. Even without rain, prolonged tackiness can provide sites for early dirt pickup.

Alkyd modification can also make acrylic latex paints more susceptible to the damaging effects of exposure. Tests have shown that the durability of modified paints decrease as the level of alkyd modification increases. Both tint retention and chalk resistance diminish because the alkyd breaks down rather rapidly on exposure. Also, problems in paint manufacture and storage can arise because the alkyd can absorb the surfactants and dispersants used for stability in the formulation. These and other problems related to alkyd modification are well known. See Mattei et al, "Chalk Adhesion Polymer for Exterior House Paints", RESIN REVIEW, vol. 24, no. 4, pages 14–22 (April 1975).

U.S. Pat. No. 4,504,609 to Kuwajima et al discloses an aqueous coating composition comprising a resinous vehicle composed of at least one aqueous resin and at least one water insoluble component. The aqueous resin can be polyester, alkyd, acrylic, acryl-modified polyester, and acyl-modified alkyd. The water insoluble resinous component is obtained by polymerization or copolymerization of alpha, beta-ethylenically unsaturated monomers.

U.S. Pat. No. 4,529,765 to DenHartog et al discloses a coating composition containing about 20–80 percent by weight of a binder and 80–20 percent by weight of a solvent for the binder. The binder comprises an acrylic amino ester polymer of polymerized monomers of methyl methacrylate and monomers of alkyl methacrylate or alkyl acrylate, and an acrylate polymer having pendent polymerizable ethylenically unsaturated groups.

U.S. Pat. No. 4,199,400 to Bakule et al discloses migration-resistant binder compositions mixed with an anionically stablized polymer latex and a volatile base.

U.S. Pat. No. 3,454,516 to Victorius discloses coating compositions comprising soft phase polymers which have infused or dissolved in them hard phase polymers.

SUMMARY OF THE INVENTION

The present invention relates to an acrylic emulsion chalk adhesion polymer which, alone or when blended with vinyl acetate/acrylic copolymer coatings, significantly improves chalk adhesion properties.

DESCRIPTION OF THE PREFERRED EMBODIMENTS

In accordance with the present invention, a chalk-adhesion polymer for exterior coatings, such as house paints or the like, is derived from a monomer composition precursor comprising an acrylic moiety, together with small amounts of a secondary amine-containing alkyl acrylate, and an acrylamide. A glycol can also be included in the composition to improve blister resistant properties.

The present chalk adhesion polymer has been found to exhibit good chalk adhesion and to improve the chalk adhesion properties of vinyl acetate/acrylic copolymer coatings when blended in proportions of about 10 to 30 weight % chalk adhesion polymer.

The chalk adhesion polymer comprises a monomer precursor composition which contains an acrylic moiety usually including at least one alkyl acrylate and one alkyl methacrylate, together with small but effective amounts of a secondary amine-containing alkyl acrylate and an acrylamide.

Generally, the monomer precursor composition includes a minor proportion of a glycol such as propylene glycol, butylene glycol, dipropylene glycol, diethylene glycol, 1,4-butanediol, 1,2-propanediol and ethylene glycol. The glycols are used primarily as surface active agents and depress the surface tension of aqueous solutions. Additionally, the glycols assist the latex to achieve improved blister resistant properties.

Preferably, the acrylic moiety includes, in combination, butyl acrylate, methyl methacrylate and 2-ethylhexyl acrylate.

The secondary amine-containing alkyl acrylates can be selected from dimethylaminoethyl methacrylate, diethylaminoethyl methacrylate, t-butylaminoethyl methacrylate, and an allylic monomer containing amino and ureido functionality (WAM TM monomer, Alcolac Co., Baltimore, MD). The polymerizable amide can be selected from N-methylol acrylamide, acrylamide, methyl acrylamidoglycolate methyl ether (MAGME) and N,N-dimethyl acrylamide. Preferably, the secondary amine-containing alkyl acrylate is dimethylaminoethyl methacrylate, and the preferred polymerizable amide is N-methylol acrylamide.

Usually the acrylic moiety comprises more than 90% by weight of the monomer composition.

The monomer precursor composition, when polymerized to form the chalk adhesion polymer latex can be used alone or blended with a vinyl-acrylic or all acrylic formulation to provide a latex coating composition. Preferably, about 10-30% of the latex coating composition comprises the chalk adhesion polymer latex. For a vinyl acetate/acrylic latex, the greater the amount of chalk adhesion polymer used, the more improved chalk adhesion and blister resistance properties are found.

The dimethylaminoethyl methacrylate (DMAEMA) is used together with a small amount of N-methylol acrylamide (NMA). It is believed that the presence of the DMAEMA and NMA act synergistically and are responsible for the chalk adhesion properties of the chalk adhesion polymer.

In the monomer composition, the amount of butyl acrylate can vary from about 0-80%, preferably 40-60%, methyl methacrylate can vary from about 5-40%, preferably 10-30%, and the 2-ethylhexyl acrylate can vary from about 0-40%, preferably 5-20%. It has also been found that the total amount of butyl acrylate plus 2-ethylhexyl acrylate should vary from about 40-80%.

The minor but highly significant components dimethylaminoethyl methacrylate can vary from about 0.5-5%, N-methylol acrylamide can vary from about 0.5-5%, and propylene glycol can vary from about 0.5-5%. All parts and percentages are by weight of the monomer composition.

The method for preparing the chalk adhesion polymer latex involves a sequence of steps which includes providing a monomer composition as a precursor to the chalk adhesion polymer latex. The components include the compounds mentioned above, namely, butyl acrylate, methyl methacrylate, 2-ethylhexyl acrylate, and dimethylaminoethyl methacrylate, which are pre-emulsified or preformed, to form a monomer pre-emulsion. A minor portion of about 3-10% of the methyl methacrylate is initially polymerized, to function as a seed component during the initial stage of polymerization.

The N-methylol acrylamide is pre-emulsified in the presence of polyethylene glycol octylphenyl ether and may be power fed or force fed to the monomer pre-emulsion continuously over a period of time to obtain the final pre-emulsified monomer mixture which forms the product chalk adhesion polymer latex with improved chalk adhesion properties.

Typically, the total amount of the monomer pre-emulsion is added continuously to the reactor over a period of about 3 to 6 hours, preferably 4 hours. The pre-emulsified N-methylol acrylamide may be power fed to the reactor over a period of 3-4 hours, preferably 3.5 hours. The product polymer latex can be used alone or blended with a vinyl/acrylic and/or acrylic formulation, such as vinyl acetate/acrylic copolymers, to form a latex coating composition. As mentioned earlier, the chalk adhesion polymer latex comprises about 10-30% of the latex coating composition.

The following examples serve to illustrate the present invention, and all parts and percentages are by weight, unless otherwise indicated.

EXAMPLE 1

A monomer composition consisting of 50 parts of butyl acrylate, 35 parts of methyl methacrylate, 13 parts of 2-ethylhexyl acrylate, 1 part of dimethylaminoethyl methacrylate, 1 part of N-methylol acrylamide and 0.05 parts of tert-dodecyl mercaptan were dispersed in 22 parts of water containing 1 part of polyethylene glycol octylphenyl ether (30 moles EO), 1.7 parts of sodium dodecyldiphenyloxide disulfonate and 2.5 parts of sodium lauryl sulfate to form a pre-emulsion. The polymerization was initiated by adding 5% of the pre-emulsion and 0.2 parts of sodium persulfate to the reaction vessel containing 44 parts of water, 0.9 parts of sodium dodecyldiphenyloxide disulfonate, 0.4 parts of ethylenediaminetetraacetic acid and 1.5 parts of propylene glycol at 75° C. The temperature was allowed to reach 78°-80° C. and held for 10 minutes. Subsequently, the remainder of the pre-emulsion was continuously fed to the reactor over 4 hours while the reactor temperature was kept at 78°-80° C. After completion of the addition, the reaction mixture was kept at 78°-80° C. for another 30 minutes and then two streams of aqueous solutions of 0.1 part tert-butyl hydroperoxide in 1.5 parts of water and 0.1 parts of sodium formaldehyde sulfoxylate in 1.5 parts of water were simultaneously added to the reaction vessel over 30 minutes. This produced a latex having a total solid of 55.5%, a Brookfield viscosity (spindle 3, 50 rpm) of 600 cps and a pH of 7.3.

EXAMPLE 2

The latex obtained from Example 1 was blended with Wallpol 40-145 (Reichhold Chemicals, Inc.), a vinyl acrylic latex in 30/70 weight ratio. The latex blend and unblended Wallpol 40-145 as a control were formulated into an unmodified exterior house paint composition and their paint properties were evaluated and recorded in Table 1 which follows:

TABLE I

| UNMODIFIED EXTERIOR HOUSE PAINT | | |
|---|---|---|
| Component | 40-145/Example 1 Latex (70/30 ratio) | 100% 40-145 |
| Pigment Slurry | 685.0 grams | 685.0 grams |
| 40-145 (55% solids) | 243.0 grams | 347.0 grams |
| Example 1 (52% solids) | 110.0 grams | — |
| 2% Thickener (250 MR solution, Hercules Co.) | 54.0 grams | 57.0 grams |
| Water | 54.0 grams | 57.0 grams |
| Total Resin Solids | 54.1 grams | 55.0 grams |
| Paint Properties | | |
| pH after 18 hours | 8.4 | 8.5 |
| Visc, KU (Krep units) after 18 hours | 83 | 86 |
| Contrast Ratio .003" Wet | .975 | .975 |
| Reflectance .003" Wet | .879 | .879 |
| Wet Adhesion (18 hours dry) | Approximate % Film Removed | |
| After 2-3 min. | 3-5 | 15-20 |
| After 5-6 min. | 3-5 | 15-20 |
| Blister Resistance (4.5 hr. dry) | | |
| After 3 hours | Excellent | Excellent |
| Chalk Adhesion (Light-Medium) | Approximate % Film Removed | |
| After 1 day dry | 10-15 | 100 |
| After 5 days dry | 1-2 | 70-75 |
| After 1 week | 1-2 | 50-55 |

It is evident from the information tabulated in Table 1 that the 40-145/Example 1 blend showed marked improvement over the control, i.e., the 100% 40-145 latex formulation in both chalk adhesion and wet adhesion performance.

EXAMPLE 3

Utilizing the process of Example 1, a monomer composition of:

| Component | Parts by Weight |
| --- | --- |
| butyl acrylate | 69 |
| methyl methacrylate | 30 |
| WAM ™ monomer (Alcolac Co., Baltimore, MD) | 1.1 | was used to prepare a latex having a total solid content of 51%, Brookfield viscosity (spindle 3, 50 rpm) of 700 cps and a pH of 6.7.

EXAMPLE 4

Utilizing the process of Example 1, a monomer composition of:

| Component | Parts by Weight |
| --- | --- |
| butyl acrylate | 54 |
| methyl methacrylate | 30 |
| 2-Ethylhexyl acrylate | 15 |
| WAM ™ monomer (Alcolac Co.) | 1.1 | was used to prepare a latex having a total solid of 51%, a Brookfield viscosity (spindle 3, 50 rpm) of 500 cps and a pH of 6.5.

EXAMPLE 5

The latices obtained from Example 3 and 4 were blended with Wallpol 40-145 (Reichhold Chemicals, Inc.), a vinyl acrylic latex in 30/70 weight ratio and were then formulated into an unmodified exterior house paint composition. The recipes for the formulation and paint properties were evaluated and tabulated in Table II as follows:

TABLE II

| Component | Control | Example 3 Blend | Example 4 Blend |
| --- | --- | --- | --- |
| 40–145 (55% solids) | 347 grams | 243 grams | 243 grams |
| Example 3 (51.4% solids) | — | 111.5 grams | — |
| Example 4 (50.9% solids) | — | — | 112.6 grams |
| Total Resin Solids | 57.0% | 53.9% | 53.7% |
| Pigment Slurry | 685 grams | 685 grams | 685 grams |
| Total Emulsion | 313 grams | 354.5 grams | 355.6 grams |
| 2% Thickener (250 MR solution, Hercules Co.) | 111 grams | 69.5 grams | 68.4 grams |
| Water | 37 grams | 37 grams | 37 grams |
| Blister Resistance | | | |
| (4 hr, dry) After 3 hrs. | Good to Moderate | Excellent | Excellent |
| Wet Adhesion | | | |
| (24 hr., dry) After 2-3 min. | Good to Moderate | Excellent | Excellent |
| Chalk Adhesion | | | |
| Slight chalk | | | |
| Overnight | 100% | 2-3% | 2-3% |
| After 1 week | 70-75% | 1-2% | 1-2% |
| Medium Chalk | | | |
| Overnight | 100% | 90-95% | 95-100% |
| After 1 week | 100% | 25-30% | 20-25% |

What is claimed is:

1. An aqueous chalk adhesion latex coating composition consisting essentially of:
   (a) about 10 to 30% of an aqueous polymer dispersion comprising:
      (i) major amounts of an acrylic moiety selected from the group consisting of an alkyl acrylate, an alkyl methacrylate, and mixtures thereof, and
      (ii) minor, but effective amounts of a secondary amine containing alkyl acrylate and an acrylamide; and
   (b) the remainder comprising a vinyl-acrylic or all acrylic formulation; wherein said composition exhibits chalk adhesion properties of about 1 to 30% film removed after one week, and excellent blister resistance.

2. The composition of claim 1, wherein the acrylic moiety comprises, in combination, butyl acrylate, methyl methacrylate, and 2-ethylhexyl acrylate.

3. The composition of claim 1, wherein the secondary amine-containing alkyl acrylate is selected from the group consisting of dimethylaminoethyl methacrylate, diethylaminoethyl methacrylate, t-butylaminoethyl methacrylate, an allylic monomer containing amino and ureido functionality and mixtures thereof.

4. The composition of claim 3, wherein the secondary amine containing alkyl acrylate is dimethylaminoethyl methacrylate.

5. The composition of claim 1, wherein the acrylamide is selected from the group consisting of N-methylol acrylamide, methyl acrylamidoglycolate methyl ether, N,N-dimethyl acrylamide, and mixtures thereof.

6. The composition of claim 5, wherein the acrylamide is N-methylol acrylamide.

7. The composition of claim 1, wherein the acrylic moiety comprises more than 90% by weight of the copolymer.

8. The composition of claim 1, wherein the precursor for the aqueous polymer dispersion comprises, in weight %, about 40–80% butyl acrylate, about 5–40% methyl methacrylate, about 5–40% 2-ethylhexyl acrylate, about 0.5–5% dimethylaminoethyl methacrylate and about 0.5–5% N-methylol acrylamide.

9. A method for preparing an aqueous chalk adhesion polymer capable of penetrating a chalky coating and adhering to the surface beneath said chalky coating which comprises:
   (a) forming a monomer composition consisting essentially of about 40 to 80 weight % butyl acrylate, about 5 to 40 weight % methyl methacrylate, about 5 to 40 weight % 2-ethyl-hexyl acrylate, about 0.5 to 5 weight % dimethylaminoethyl methacrylate and about 0.5 to 5 weight % N-methylol acrylamide;
   (b) pre-emulsifying the components of step (a) to form an aqueous monomer pre-emulsion;
   (c) charging about 3 to 10% of the monomer pre-emulsion to a reactor to initiate the reaction at a temperature below about 80° C.;
   (d) slowly adding the remaining portion of the monomer pre-emulsion to the reactor at a temperature below about 80° C. until the reaction is completed to form said chalk adhesion polymer in aqueous dispersion;
   (e) wherein said chalk adhesion polymer exhibits chalk adhesion properties of about 1 to 30% film removed after 1 week, and excellent blister resistance.

10. The method of claim 9, wherein the chalk adhesion polymer is blended with an acrylic formulation to form a chalk adhesion latex coating composition comprising about 10-30% by weight of the chalk adhesion polymer.

11. The method of claim 9, wherein the monomer composition of step (a) comprises in weight % about 40-60% butyl acrylate, about 10-30% methyl methacrylate, about 5-20% 2-ethylhexyl acrylate, about 0.5-5% dimethylamino-ethyl methacrylate, and about 0.5-5% N-methylol acrylamide.

12. The method of claim 9, wherein the monomer is emulsified in the presence of about 0.5-5% by weight of a glycol.

13. The method of claim 12, wherein the glycol is selected from the group consisting of propylene glycol, butylene glycol, dipropylene glycol, diethylene glycol, 1,4-budanediol, 1,2-propanediol and ethylene glycol.

14. The method of claim 9, wherein the monomer pre-emulsion of step (b) is charged to the reactor over a period of about 3 to 6 hours.

15. The product formed by the method of claim 9.

* * * * *